United States Patent [19]

Leitermann

[11] 4,174,197

[45] Nov. 13, 1979

[54] ROTARY-PISTON MACHINE HAVING A LIQUID-COOLED PISTON

[75] Inventor: Wulf Leitermann, Bad Wimpfen, Fed. Rep. of Germany

[73] Assignee: Audi NSU Auto Union Aktiengesellschaft, Neckarsulm, Fed. Rep. of Germany

[21] Appl. No.: 814,702

[22] Filed: Jul. 11, 1977

[30] Foreign Application Priority Data

Jul. 14, 1976 [DE] Fed. Rep. of Germany ....... 2631619

[51] Int. Cl.$^2$ ............................................. F01C 21/06
[52] U.S. Cl. ................................. 418/84; 418/87; 418/94; 123/41.13
[58] Field of Search ...................... 418/84, 87, 94; 417/228; 123/41.13

[56] References Cited

U.S. PATENT DOCUMENTS

| 2,049,794 | 8/1936 | Armor | 417/228 |
|---|---|---|---|
| 3,131,679 | 5/1964 | Peras | 418/88 X |
| 3,876,345 | 4/1975 | Froede et al. | 418/84 |
| 4,011,032 | 3/1977 | Steinwart et al. | 418/84 |

FOREIGN PATENT DOCUMENTS 428486 12/1947 Italy ............................................. 418/84

Primary Examiner—Carlton R. Croyle
Assistant Examiner—Leonard E. Smith
Attorney, Agent, or Firm—Kane, Dalsimer, Kane, Sullivan & Kurucz

[57] ABSTRACT

A rotary-piston machine, in particular a rotary-piston combustion engine of trochoid type is provided. The machine includes a housing composed of at least one shell and at least two parallel end pieces and is traversed perpendicular to the end pieces by an eccentric shaft mounted in the end pieces. A liquid-cooled polygonal piston is rotatably mounted on the eccentric of the shaft. The piston contains cavities provided with at least one aperture near their radially inner portion. The eccentric shaft has an axial bore traversed by the liquid and communicating by way of transverse holes with the bearing and with at least one nozzle. The orifice of the nozzle is directed at the aperture of the piston cavities. Controls are arranged in the axial bore of the eccentric shaft for controlling the communication between the axial bore and the nozzle according to the engine load and/or the temperature of the liquid.

4 Claims, 7 Drawing Figures

ROTARY-PISTON MACHINE HAVING A LIQUID-COOLED PISTON

BACKGROUND OF THE INVENTION

The invention relates to a rotary-piston machine, in particular a rotary-piston internal combustion engine of trochoid type having a housing composed of at least one shell and at least two parallel end pieces and traversed by an eccentric shaft mounted in the end pieces and perpendicular thereto. A polygonal liquid-cooled piston is rotatably mounted on the eccentric of the shaft. The piston contains cavities provided with at least one aperture near their radially inner portion. The eccentric shaft has an axial bore through which the liquid flows communicating by way of transverse holes with the bearing points and with at least one spray nozzle. The orifice of the spray nozzle is directed at the aperture of the cavities in the piston.

A rotary-piston combustion engine of the type under consideration is present in German Pat. No. 1,223,610 in that engine, the liquid serving to lubricate the bearings of the eccentric shaft and the piston is employed to cool the piston as well. The cooling of the piston is thus accomplished predominantly by the liquid directly injected into the piston cavities by way of the nozzle, and in smaller, less effective part by the fluid draining from the piston bearing. But since the nozzle has an open cross-section, liquid is delivered through the nozzle into the piston cavities at all times, independently of engine operating temperature and load. Especially after a cold start and in the warm-up phase, this may result in the occurrence of high fuel consumption and unfavorable exhaust properties. This is because the piston has a comparatively large surface giving off heat and the comparatively cool liquid delivered into the cavities will retard rapid attainment of operating temperature in said modes. Another disadvantage of that design, however, is that the constant supply of liquid through the nozzle into the cavities interferes with building up a sufficient liquid pressure to lubricate the shaft and piston bearings at low speeds and idling, especially when the engine is cold.

Another type of rotary piston engine is present in Japanese Pat. No. Des. 47-14481. In that engine, the feed passage in the eccentric shaft to supply liquid to the piston cavities is made to be closable at low temperatures. This setting is effected by an expansion element arranged in the piston. The element acts on a rotary slide surrounding the piston bearing bushing and obturates or exposes the supply passage according to the effect of temperature. However, function of such a control is not necessarily assured because the expansion element is continually subjected to the alternation of centrifugal and centripetal forces owing to the manner of its arrangement on the piston and, hence, to high mechanical stress. The expansion element has a limited service life due to the comparatively high piston temperature. Furthermore, the function of this device cannot be monitored, and in event of damage, it cannot be dismantled without much outlay. Likewise disadvantageous is the fact that the central bearing surface of the bushing in the piston is lost because of the rotary slide surrounding the bushing, which necessitates widening the bushing.

SUMMARY OF THE INVENTION

The object of the invention is to avoid the above disadvantages and provide a rotary-piston machine of the type described above having a means acting on the nozzle which is both largely relieved of inertial forces and readily accessible, and also affords dependable operation according to engine load and/or the temperature of the liquid.

This object is accomplished by arranging a control member in the axial bore of the eccentric shaft. The control member controls communication between the axial bore and the transverse hole to the nozzle according to engine load and/or the temperature of the liquid.

First, with this device ready accessibility of the control means is achieved. It is comparatively simple to insert and pull from one end of the eccentric shaft, and it is not subjected to any influences of centrifugal forces, thanks to its central arrangement. Second, the flow of fluid through the piston is successfully adjusted to engine load and/or liquid temperature in any given time, so that in every operating mode, an advantageous piston temperature results, leading to diminished cold wear, improved exhaust properties and reduced fuel consumption.

The control means may have a sleeve arranged in the axial hole and longitudinally displaceable so that the communication with the nozzle is shut off below a certain temperature and/or load (idling and lower partial load interval), and reopened above at least one of said limits.

At low temperature, as after a cold start or idling and in the lower partial load range, as well as in drag mode, if a temperature drop occurs, the piston is not cooled owing to shut-off or throttling of the liquid feed, so that the correct piston temperature can be reached in a short time and maintained as well. On the other hand, with rising temperature and/or increased load delivery of liquid to the piston cavities is restored so that the piston is suitably cooled by supply of a definite flow of liquid.

To displace the sleeve according to the temperature, an expansion element having two parts movable relative to each other and bathed by the liquid may be provided in the axial bore. The first part is connected to the sleeve and the second part is connected to the eccentric shaft. This type of construction is advantageous for the reason that the temperature of the liquid is a simple and reliable measure of the operating temperature of the engine from time to time.

Alternatively, however, a plunger connected to the sleeve may be provided in the axial bore to displace the sleeve according to laod. The plunger is movable in one direction by the pressure of the liquid in the axial bore to shut off communication with the nozzle and in the other direction by a spring to restore communication with the nozzle. The space behind the plunger may be in communication firstly through a passage with the pressure face of the plunger and secondly with a return of larger cross section, in which a valve gradually closing with increasing load and gradually opening with decreasing load is arranged.

In this version, when the valve is opened—corresponding to idling or lower partial load range setting, a portion of the liquid will drain from the axial bore through the plunger, setting up a pressure gradient in flow direction, with the result that the plunger together with the sleeve can be forced by the liquid against the action of the spring into that extreme position in which the sleeve shuts off communication with the nozzle, so that the piston is not cooled. When the valve is closed—corresponding to full-load setting—, contrariwise, the same liquid pressure can establish itself on both sides of the plunger, so that the spring forces the plunger into the other extreme position, in which the sleeve restores communication with the nozzle orifice and hence supply of liquid to cool the piston. Of course, depending on the degree of opening of the valve, intermediate settings can result, and hence varying flows of liquid be supplied by the nozzle.

An especially advantageous design has been found when the second part of the expansion element is connected to the plunger.

In this version, the flow of liquid to the piston cavities can be shut off at low load and at low temperature. A rapid rise of piston temperature can thereby occur, and a rapid elevation of operating temperature be achieved. On the other hand, when either of these limits is transgressed, cooling of the piston sets in, so that, contrary to known designs, there is the possibility of preventing overheating of the piston and also achieving an optimum piston temperature according to the temperature and the load.

Further details and features of the invention will be more fully illustrated in the description to follow, with reference to the drawings.

DETAILED DESCRIPTION

Figure 1:
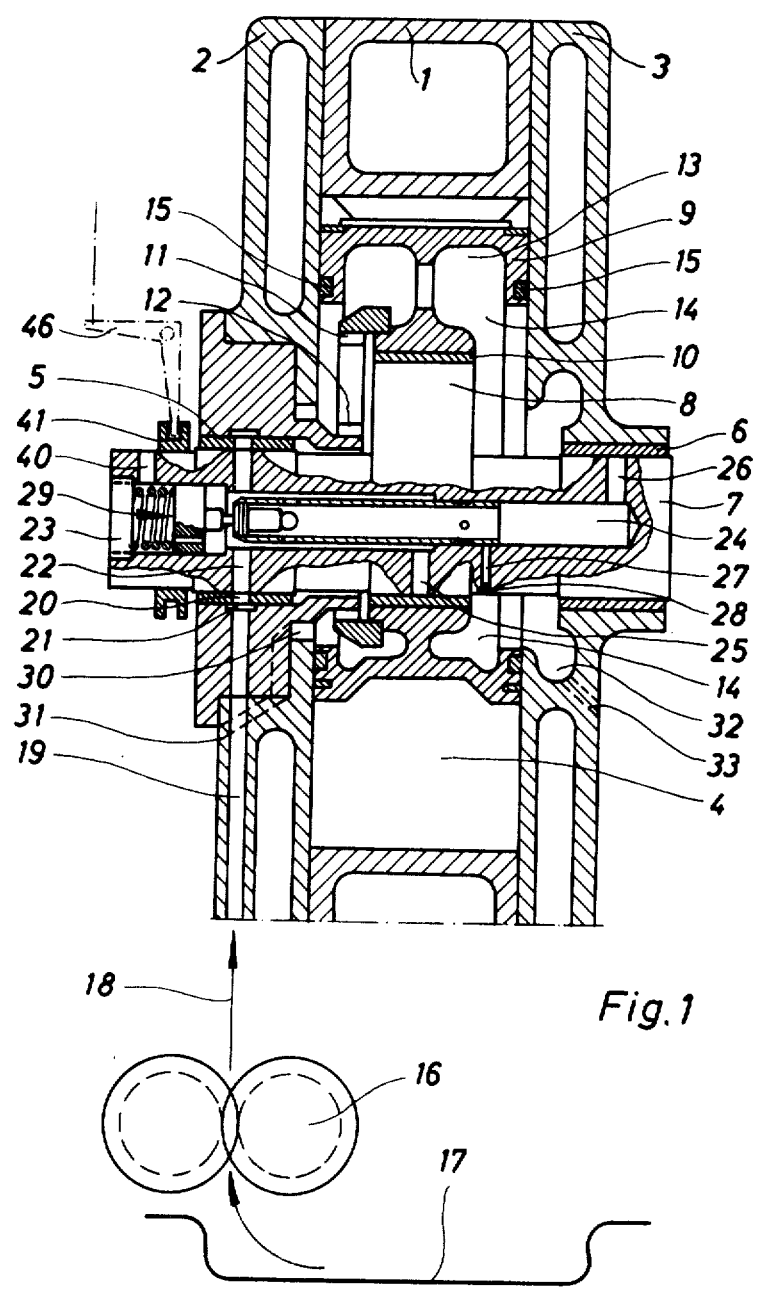
FIG. 1 shows a longitudinal section of a rotary-piston combustion engine having a control means arranged in the eccentric shaft to control the liquid cooling of the piston.

Reference is made to FIG. 1, showing a rotary-piston internal combustion engine having a housing composed essentially of a shell 1 and two parallel end pieces 2 and 3, and bounding a working chamber 4. In end pieces 2 and 3, an eccentric shaft 7 is mounted on journal bearings 5 and 6, its eccentric 8 bearing a polygonal piston 9 rotatable on a piston bearing 10. The speed of piston 9, by virtue of a transmission consisting of an internal gear 11 fixed to piston 9 and a pinion 12 fixed to end piece 2, bears a fixed ratio to the speed of eccentric shaft 7. Piston 9 is provided with cavities 13 into which—by way of an aperture 14 directed inward towards the axis of rotation of the piston near its radially inner portion—lubricating and/or cooling liquid can enter. To prevent this liquid from leaking through aperture 14 into working chamber 4, sealing rings 15 are provided, which sealingly cooperate with the faces of piston 9 and the walls of the adjoining end pieces 2 and 3.

A liquid circuit is provided to lubricate bearings 5 and 6 and piston bearing 10 and to cool piston 9. The liquid circuit includes a pump 16 shown schematically and a tank 17. The pump 16 takes in liquid from tank 17 and delivers it by way of a line 18 to a passage 19 in end piece 2 and to bearing 5. Bearing 5 has holes 20 communicating firstly by way of an annular groove 21 encircling bearing 5 with the passage 19 and secondly with a transverse hole 22 in eccentric shaft 7. The transverse hole 22 opens into a centrally arranged axial bore 24, closed with a plug 23, of eccentric shaft 7, whence a transverse hole 25 leads to piston bearing 10 and a transverse hole 26 to the other journal bearing 6.

Thus the piston bearing 10 and journal bearing 6 are also supplied with liquid. An additional transverse hole 27 communicating with axial bore 24 is provided to cool the piston 9. Transverse hole 27 has a nozzle 28 whose orifice is directed at aperture 14 of the cavities 13 of piston 9. A control means 29 is arranged in axial bore 24 to control communication between axial bore 24 and nozzle 28. The control means releases or shuts off the supply of liquid to nozzle 28 according to engine load and/or liquid temperature. The liquid draining off from journal bearings 5 and 6 and piston bearing 10 and the liquid leaking from cavity 13 of piston 9 is carried away through the annular space 30 between internal gear 11 and pinion 12 and the passage 31 in end piece 2 and through annular space 32 and passage 33 in end piece 3, the passages 31 and 33 leading back to tank 17.

Figure 2:
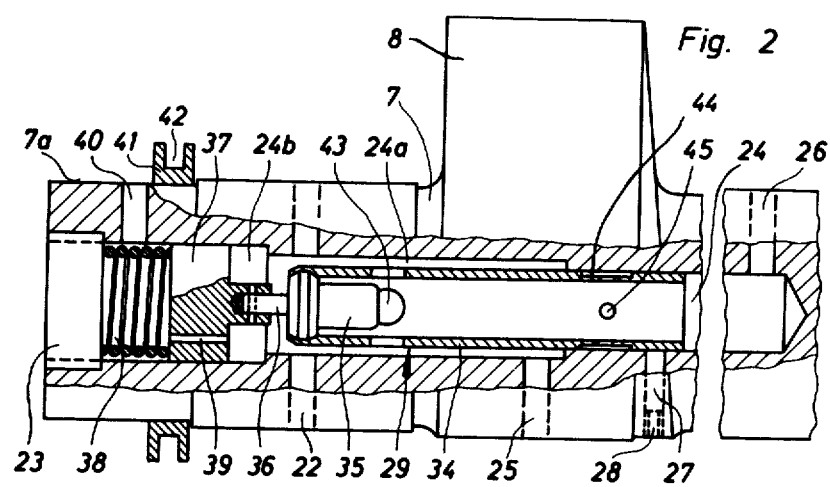
FIG. 2 shows a portion of the eccentric shaft, in partial section, with a first embodiment of a control means arranged in the axial bore and occupying a first operating position.

As shown in FIG. 2, the control means 29 in this embodiment by way of example specifically has a sleeve 34 slidable lengthwise in the central axial bore in the vicinity of the transverse hole 27. From this point on, the axial bore 24 is widened stepwise towards the plug 23 to successive bore diameters 24a and 24b. The division 24a of the bore is provided to ensure unimpeded supply of liquid from transverse hole 22 to transverse hole 25. At the end of sleeve 34 to the left in the drawing, an expansion element 35 having two parts movable relative to each other is fixed by its first part, and fastened by way of its second part, in the form of a pressure pin 36, to a plunger 37. Plunger 37 is arranged displaceable lengthwise in a division 24b, opened out to a larger diameter, of axial bore 24. A compression spring is arranged between plunger 37 and plug 23. A hole 39 passes through plunger 37. The port area of the hole is so proportioned that only a small flow of fluid, not adversely affecting the liquid supply, can pass. By way of hole 39, the region in which transverse hole 22 opens out communicates with a return. The return is formed by a transverse hole 40 leading out of the region of the bore division 24b in which the compression spring 38 is arranged. Transverse hole 40 has a larger port area than bore 39, so that when hole 40 is clear, a pressureless drainage of liquid from this region is assured. A slide ring 41 is arranged on the peripheral surface 7a where the transverse hole 40 opens. The slide ring cooperates with hole 40 and with it forms a valve to drain the liquid. Slide ring 41 has a groove 42 on its outer periphery, engaged by a linkage 46 indicated in FIG. 1 and connected to a control means, for example a linkage leading to a throttling flap not shown, transmitting the instantaneous engine load. In sleeve 34, near expansion element 35, ports 43 are provided, to establish communication between the region of bore division 24a where transverse hole 22 opens out and the transverse hole 26 emanating from axial bore 24. In addition, on the outer periphery of the sleeve 34 sliding in axial bore 24, an annular groove 44 is arranged, in communication by way of radial holes 45 with the axial bore 24 carrying the liquid.

When the rotary-piston internal combustion engine is put into operation cold, and continues idling or in the lower partial-load range after such cold start, the control member 29 assumes the first operating position, shown in FIG. 2. This position results because firstly slide ring 41 clears transverse hole 40 in idling, and the comparatively small flow of liquid passing through the smaller hole 39 can drain off without pressure through transverse hole 40, and secondly the liquid delivered by way of transverse hole 22 to axial bore 24 acts against plunger 37 and thus holds control means 29 in this position against the action of spring 38. Thus sleeve 34 obturates access to transverse hole 27, so that the piston is not cooled, and operating temperature can therefore be reached comparatively fast.

Figure 3:
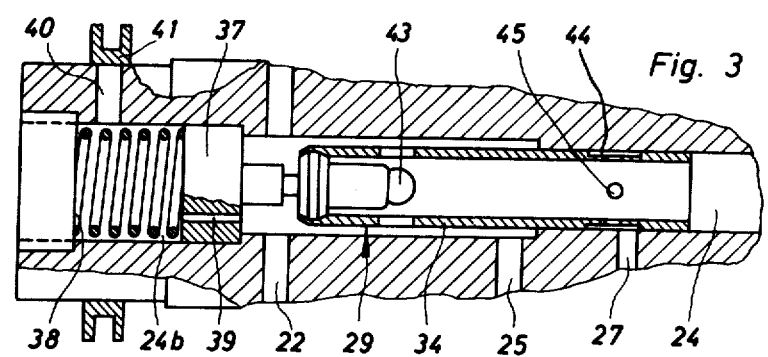
FIG. 3 shows the portion of the eccentric shaft as in FIG. 2 with the control means in a second operating position.

In FIG. 3, where only the region immediately surrounding the control means 29 that is pertinent to the invention is represented, the operating position assumed by the control means at full load after a cold start is shown. In this case, the transverse hole 40 is obturated by slide ring 41 so that the liquid passing by way of hole 39 cannot drain off. Instead, a pressure equilibrium takes place on either side of plunger 37, with the result that the compression spring 38 forces plunger 37 to the right in the drawing towards the shoulder of division 24b and thereby displaces sleeve 34 correspondingly to the right. In this position, communication is set up by way of radial holes 45 and annular groove 44 between axial bore 24 and transverse hole 27 with nozzle 28, so that the piston cooling required in this operating condition sets in, avoiding injurious overheating of the piston and the engine.

Figure 4:
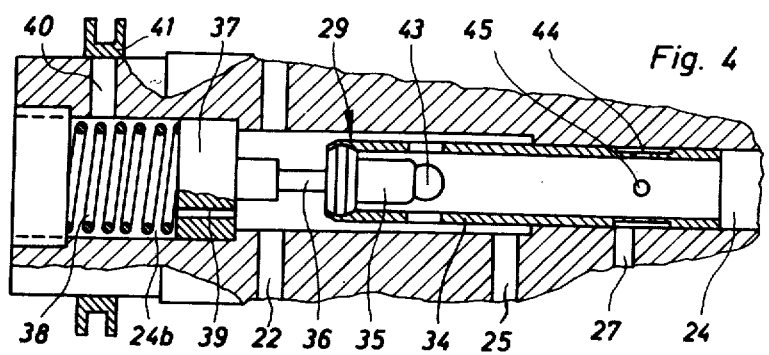
FIG. 4 shows the portion of the eccentric shaft as in FIG. 2 with the control means in a third operating position.

The operating position shown in FIG. 4 is assumed by control means 29 at full load after operating temperature of the engine has been reached. Since slide ring 41 closes transverse hole 40 at full load, plunger 37 remains in position pressed against the shoulder. With attainment of operating temperature, the liquid too exhibits a correspondingly elevated temperature, to which the liquid-bathed expansion element 35 responds, and slides sleeve 34 still farther to the right by way of pin 36. Since annular groove 44 is made wide enough, the supply of liquid to the piston is maintained.

Figure 5:
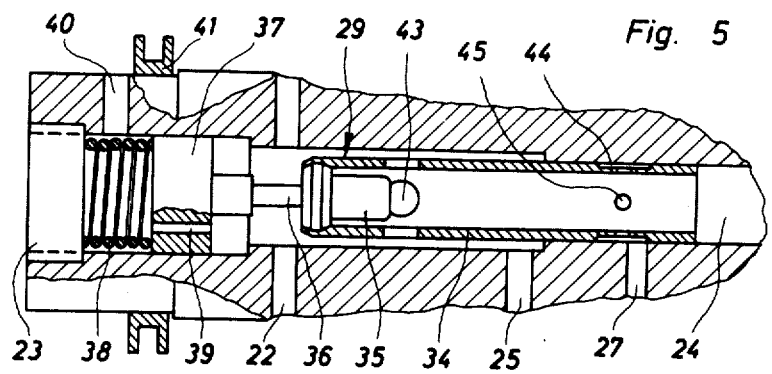
FIG. 5 shows the portion of the eccentric shaft as in FIG. 2 with the control means in a fourth operating position.

In the operation position of control means 29 shown in FIG. 5, the engine is running at operating temperature, idling or in the lower partial-load range. This means that plunger 37, owing to clearance of transverse hole 40, is pushed by the pressure of the liquid into the position described for FIG. 2, whereby sleeve 34 is indeed drawn likewise to the left. But, because expansion element 35 is at operating temperature, and because of the broad annular groove 44, communication between axial bore 24 and transverse hole 27 to nozzle 28 remains open. If the engine idles, there is generally a lowering of operating temperature and a corresponding cooling of the liquid, with the result that expansion element 35 draws sleeve 34 farther to the left into the operating position described for FIG. 2, whereby the supply of liquid to the piston is interrupted and thus excessive cooling of the piston is avoided.

In FIGS. 2, 3, 4 and 5, only the respective extreme positions are shown that the control means assumes under the influence of load and operating temperature. Obviously with a slighter temperature increase or at smaller load, intermediate settings result, which in these cases also necessitates a corresponding smaller flow of liquid to cool piston 9.

The control provided for the feed of liquid to the piston, in addition to a rapid rise of operating temperature of piston 9 when the engine is cold and moderation of any undue cooling of the piston when idling, has the further advantage that the control means is easily installed by way of plug 23, and that the central rotationally symmetrical arrangement is not exposed to any influences of centrifugal force to compromise its function.

When sufficient for applicable requirements, the control means, in departure from the embodiments shown by way of example in FIGS. 1-5, may be actuated either according to engine load only or according to liquid temperature only.

Figure 6:
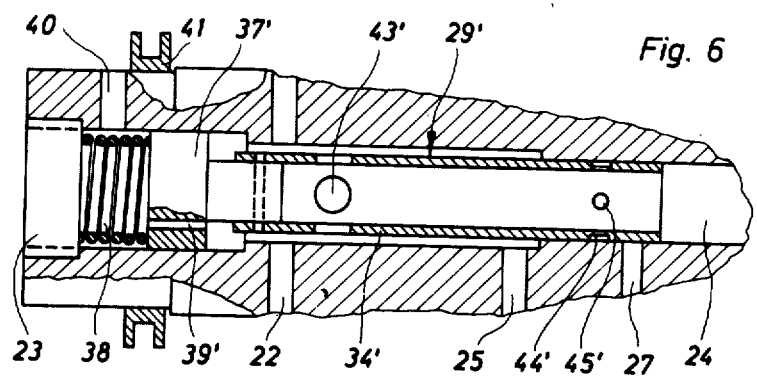
FIG. 6 shows the portion of an eccentric shaft much as in FIG. 2 with a second embodiment of the control means.

As shown in FIG. 6, in which the same reference numerals are used for the same or similar parts as in FIGS. 1-5, sleeve 34' of control means 29' is attached directly to plunger 37'. In this case, control means 29' operate only according to load, that is, at higher load the feed between axial bore 24 and nozzle 28 is cleared, and in idling or at lower load—as shown—it is shut off.

Figure 7:
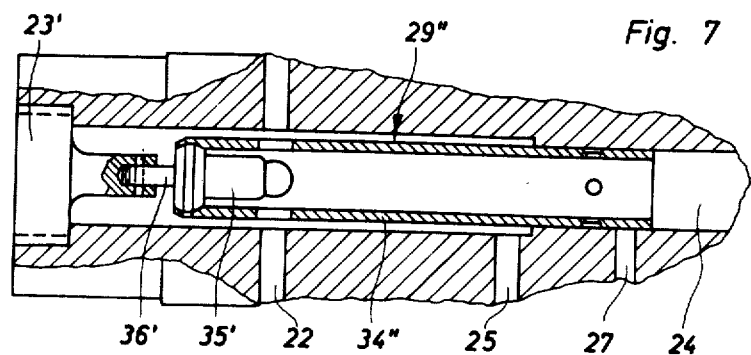
FIG. 7 shows the portion of an eccentric shaft much as in FIG. 2 with a third embodiment of the control means.

In FIG. 7, where likewise the same reference numerals as in FIGS. 1-5 have been used for the same or similar parts, the control means 29" operates according to the temperature of the liquid. For this purpose, the sleeve 34" is attached to plug 23' screwed into eccentric shaft 7 by the second part, in the form of a pin 36', of expansion element 35'. In this embodiment, communication between axial bore 24 and transverse hole 27 to nozzle 28 is released with increasing liquid temperature and closed—as shown—with falling or lower temperature.

Otherwise, the mode of operation of control means 29' with plunger 37' (in FIG. 6) and of control means 29" with expansion element 35' (in FIG. 7) is the same as described for FIGS. 2-5.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims:

I claim:

1. A rotary-piston machine, in particular a rotary-piston combustion engine of trochoid type comprising; a housing composed of at least one shell and at least two parallel end pieces and traversed perpendicular to the end pieces by an eccentric shaft mounted on bearings in the end pieces, a liquid-cooled polygonal piston rotatably mounted on the eccentric of the shaft, the piston containing cavities provided with at least one aperture near their radially inner portion, the eccentric shaft having an axial bore traversed by the liquid and communicating by way of transverse holes with the bearings and with at least one nozzle, the orifice of the nozzle being directed at the aperture of the piston cavities, control means arranged in the axial bore of the eccentric shaft for controlling the communication between the axial bore and the nozzle according the temperature of the liquid, the control means including a sleeve arranged in the axial bore and longitudinally displaceable so that the transverse hole leading to the nozzle is shut off by the sleeve below a certain temperature (idling and lower partial-load range) and opened above said temperature, and in order to displace the sleeve in the axial bore according to the temperature, a liquid-bathed expansion element having two parts relative to each other is provided, the first part of the expansion element connected to the sleeve and the second part of the expansion element connected to the eccentric shaft, and the sleeve being traversed by the liquid and a continuation of the sleeve in the shaft leads to a shaft bearing.

2. The invention in accordance with claim 1 wherein in order to displace the sleeve in the axial bore according to load a plunger connected to the sleeve is provided, the plunger is movable in one direction by the pressure of the liquid in the axial bore to shut off communication to the nozzle and in the other direction by a spring to restore communication to the nozzle, the space behind the plunger being in communication firstly by way of a passage with the pressure face of the plunger and secondly with a return of larger diameter, in which a valve is arranged gradually closing with increasing load and gradually opening with decreasing load.

3. A rotary-piston machine, in particular a rotary-piston combustion engine of trochoid type comprising; a housing composed of at least one shell and at least two parallel end pieces and traversed perpendicular to the end pieces by an eccentric shaft mounted on bearings in the end pieces, a liquid-cooled polygonal piston rotatably mounted on the eccentric of the shaft, the piston containing cavities provided with at least one aperture near their radially inner portion, the eccentric shaft having an axial bore traversed by the liquid and communicating by way of transverse holes with the bearings and with at least one nozzle, the orifice of the nozzle being directed at the aperture of the piston cavities, control means arranged in the axial bore of the eccentric shaft for controlling the communication between the axial bore and the nozzle according to the engine load, the control means including a sleeve arranged in the axial bore and longitudinally displaceable so that communication to the nozzle is shut off below a certain load (idling and lower partial-load range) and restored above said limit, in order to displace the sleeve in the axial bore according to load a plunger connected to the sleeve is provided, the plunger is movable in one direction by the pressure of the liquid in the axial bore to shut off communication to the nozzle and in the other direction by a spring to restore communication to the nozzle, the space behind the plunger being in communication firstly by way of a passage with the pressure face of the piston and secondly with a return of larger diameter, in which a valve is arranged gradually closing with increasing load and gradually opening with decreasing load.

4. A rotary-piston machine, in particular a rotary-piston combustion engine of trochoid type comprising; a housing composed of at least one shell and at least two parallel end pieces and traversed perpendicular to the end pieces by an eccentric shaft mounted on bearings in the end pieces, a liquid-cooled polygonal piston rotatably mounted on the eccentric of the shaft, the piston containing cavities provided with at least one aperture near their radially inner portion, the eccentric shaft having an axial bore traversed by the liquid and communicating by way of transverse holes with the bearings and with at least one nozzle, the orifice of the nozzle being directed at the aperture of the piston cavities, control means arranged in the axial bore of the eccentric shaft for controlling the communication between the axial bore and the nozzle according to the engine load and the temperature of the liquid, the control means including a sleeve arranged in the axial bore and longitudinally displaceable so that communication to the nozzle is shut off below a certain temperature and load (idling and lower partial-load range) and restored above said limits, in order to displace the sleeve in the axial bore according to the temperature, a liquid-bathed expansion element having two parts movably relative to each other is provided, the first part of the expansion element being connected to the sleeve and the second part of the expansion element being connected to the eccentric shaft, a plunger is provided connected to the sleeve and movable in one direction by the pressure of the liquid in the axial bore to shut off communication to the nozzle and in the other direction by a spring to restore communication to the nozzle, the space behind the plunger being in communication firstly by way of a passage with the pressure face of the plunger and secondly with a return of larger diameter, in which a valve is arranged gradually closing with increasing load and gradually opening with decreasing load, and the second part of the expansion element being connected to the plunger.

* * * * *